(12) United States Patent
Clemo et al.

(10) Patent No.: US 8,756,440 B2
(45) Date of Patent: Jun. 17, 2014

(54) SYSTEM POWER CAPPING USING INFORMATION RECEIVED FROM THE INSTALLED POWER SUPPLY

(75) Inventors: Raymond Mathew Clemo, Raleigh, NC (US); Nickolas John Gruendler, Pflugerville, TX (US); Beth Frayne Loebach, Raleigh, NC (US); Gregory Joseph McKnight, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1827 days.

(21) Appl. No.: 12/104,232

(22) Filed: Apr. 16, 2008

(65) Prior Publication Data

US 2009/0265564 A1    Oct. 22, 2009

(51) Int. Cl.
*G06F 1/26* (2006.01)

(52) U.S. Cl.
USPC ........................................................ 713/300

(58) Field of Classification Search
USPC ........................................................ 713/300
See application file for complete search history.

(56) References Cited

U.S. PATENT DOCUMENTS

| | | | |
|---|---|---|---|
| 6,191,498 B1 * | 2/2001 | Chang | 307/11 |
| 6,252,380 B1 * | 6/2001 | Koenck | 320/150 |
| 6,661,119 B2 * | 12/2003 | Liu et al. | 307/71 |
| 6,986,069 B2 | 1/2006 | Oehler et al. | |
| 7,078,865 B2 * | 7/2006 | Sano et al. | 315/169.3 |
| 7,228,448 B2 * | 6/2007 | Anderson et al. | 713/340 |
| 7,313,714 B1 | 12/2007 | Helfinstine et al. | |
| 7,581,130 B2 * | 8/2009 | Carroll et al. | 713/340 |
| 7,800,894 B2 * | 9/2010 | Davis | 361/679.33 |
| 7,921,315 B2 * | 4/2011 | Langgood et al. | 713/340 |
| 2007/0094524 A1 | 4/2007 | Kris | |
| 2007/0180280 A1 | 8/2007 | Bolan et al. | |
| 2007/0245161 A1 | 10/2007 | Shaw et al. | |
| 2008/0043769 A1 * | 2/2008 | Hirai | 370/420 |

* cited by examiner

*Primary Examiner* — Kim Huynh
*Assistant Examiner* — Eric Chang
(74) *Attorney, Agent, or Firm* — Katherine S. Brown; Jeffrey L. Streets

(57) ABSTRACT

A computer system comprising a motherboard and a power supply having an associated power management bus controller with memory storing the power capacity of the associated power supply. A power circuit provides power from the power supply to the motherboard, wherein the motherboard has a processor and a baseboard management controller. The system further comprises a power management bus providing communication between the baseboard management controller and the power management bus controller associated with the selected power supply, wherein the power management bus controller provides the stored power capacity to the baseboard management controller. This allows the baseboard management controller to limit operation of the processor to control the amount of power consumed from exceeding the power capacity of the selected power supply. The power capacity of the power supply may be sent to the baseboard management controller in response to booting the motherboard.

19 Claims, 6 Drawing Sheets

SYSTEM POWER CAPPING USING INFORMATION RECEIVED FROM THE INSTALLED POWER SUPPLY

BACKGROUND OF THE INVENTION

1. Field of the Invention

The present invention relates to methods and systems for supplying power to a computer system, and more specifically to the methods and systems for controlling the amount of power consumed by computer systems.

2. Background of the Related Art

Modern data centers include large numbers of electronic components that require electrical power to operate. In fact, sufficient power capacity must be provided to support each of the electronic components over an operating range up to the maximum possible power that the components can draw. The maximum possible power drawn by an electronic component, or group of components, is sometimes referred to as the maximum label power. In a rack for supporting and operating computer systems, such as a group of servers and supporting hardware, the power circuits must be able to supply enough power to operate the rack at the most extreme configuration of components and the maximum workload scenario. This is the case even though the actual operating power may be only about 30% to 70% of the maximum label power. Furthermore, regulations generally require that the rack power circuits have the capacity to provide 20% more power than the sum of the maximum label power for each electronic component. Unfortunately, providing excess and unused power capacity increases infrastructure and operating costs. Furthermore, if the data center can support only a limited total power, excess power means that fewer electronic components can be installed in the data center.

Software power capping tools, such as ADVANCED ENERGY MANAGER (a trademark of International Business Machines Corporation, Armonk, N.Y.), can be used to limit the power consumption of a computer system. However, because software is subject to modification or failure, regulations generally prohibit reliance on software to control the total power to the system.

BRIEF SUMMARY OF THE INVENTION

One embodiment of the present invention provides a computer system, comprising a motherboard and a power supply interchangeably selected from a group of power supplies having different power capacities, each power supply having an associated power management bus controller with memory storing the power capacity of the associated power supply. A power circuit provides power from the power supply to the motherboard, wherein the motherboard has a processor and a baseboard management controller. The system further comprises a power management bus providing communication between the baseboard management controller and the power management bus controller associated with the selected power supply, wherein the power management bus controller provides the stored power capacity to the baseboard management controller, and wherein the baseboard management controller limits operation of the processor to control the amount of power consumed from exceeding the power capacity of the selected power supply. Optionally, the baseboard management controller may control the amount of power consumed using a software application program.

Another embodiment of the invention provides a method of controlling power consumption in a computer system. The method comprises selectively coupling a power circuit and a power management bus between a motherboard having a baseboard management controller and a power supply having a power management bus controller, sending a power capacity rating of the power supply from the power management bus controller to the baseboard management controller over the power management bus, and controlling the operation of the motherboard to prevent power consumption from exceeding a power cap that is equal to the power capacity rating of the power supply. Preferably, the power supply is interchangeably selected from a group of power supplies having different power capacities, each power supply having an associated power management bus controller with memory storing the power capacity rating of the associated power supply. Most preferably, the step of sending the power capacity of the power supply to the baseboard management controller is performed in response to booting the motherboard.

Yet another embodiment of the invention provides a computer program product for controlling power consumption, the computer program product comprising a computer usable medium embodying computer usable program code. The computer usable program code comprises program instructions for sending a power capacity rating of the power supply from the power management bus controller to the baseboard management controller over the power management bus, and program instructions for controlling the operation of the motherboard to prevent power consumption from exceeding a power cap that is equal to the power capacity rating of the power supply.

DETAILED DESCRIPTION OF THE INVENTION

Figure 1:
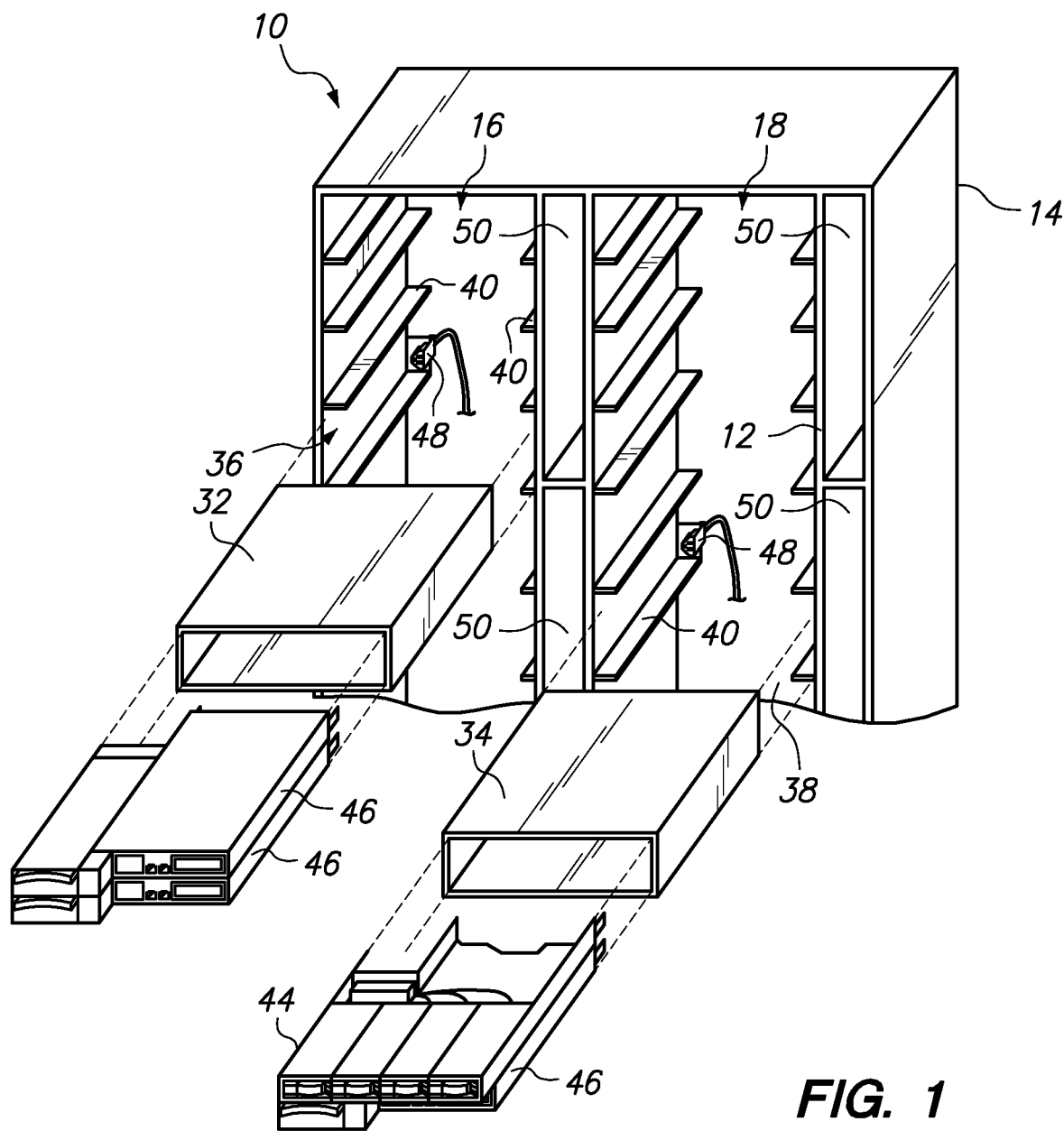
FIG. 1 is a perspective view of a rack receiving a pair of chassis, wherein each chassis is receiving two modules.

One embodiment of the present invention provides a computer system, comprising a motherboard and a power supply interchangeably selected from a group of power supplies having different power capacities, each power supply having an associated power management bus controller with memory storing the power capacity of the associated power supply. A power circuit provides power from the power supply to the motherboard, wherein the motherboard has a processor and a baseboard management controller. The system further comprises a power management bus providing communication between the baseboard management controller and the power management bus controller associated with the selected power supply, wherein the power management bus controller provides the stored power capacity to the baseboard management controller, and wherein the baseboard management controller limits operation of the processor to control the amount of power consumed from exceeding the power capacity of the selected power supply.

Optionally, the baseboard management controller may control the amount of power consumed using a software application program. For example, one suitable power capping software application program is ADVANCED ENERGY MANAGER (a trademark of International Business Machines Corporation, Armonk, N.Y.).

In various embodiments of the system, the power supply and the motherboard are installed in a common chassis. An exemplary chassis is a 2U chassis that includes a power supply providing power to two 1U modules, wherein at least one of the modules is a compute module including the motherboard. This type of chassis allows the system to be configured with various combinations of modules which, along with the expected workload of the system, establish the power requirements of the system. A system administrator may determined the power requirements of the system and select a power supply that will meet the needs of the system configuration and workload, preferably without providing large amounts of power in excess of typical operating needs. Accordingly, a power supply with a low power capacity rating is selected and installed in the chassis when it is determined that the combination of modules installed in that chassis, along with the expected workloads, can be operated adequately within that low power capacity rating. A power supply with a higher power capacity rating is selected and installed in the chassis when the module configuration and workload are determined to require greater amounts of power. In a preferred embodiment, the installed power supply is selected from a group of power supplies having different power capacities. For example, power supplies may be provided with a power capacity of 300 W, 600 W, 900 W or 1200 W. Each power supply has an associated power management bus controller with memory storing the power capacity of the associated power supply. Preferably, each power supply provides a common interface for selectively coupling with the modules.

In a modular compute system, such as the 2U chassis system just described, the motherboard is included in a compute module. The chassis may also include at least a second module selected from a compute module and an expansion module. However, the invention may also be carried out in a stand-alone computer. Even in a system configured with multiple compute modules each having a motherboard, the power capping of the invention may be carried out by a motherboard of a single compute module. In particular, a single baseboard management controller may be used to control the total power consumption of multiple modules, optionally including common infrastructure such as fans.

It is preferable for any expansion module to interface directly with a compute module within the same chassis, such as through an interface to a system bus or peripheral bus. These interconnections between modules are preferably made prior to installing the modules into a chassis. Furthermore, each compute module preferably has an input/output panel on the front side of the module, wherein the input/output panel includes at least one input/output port for receiving a network cable.

In a further embodiment, each module includes a power paddle for selective coupling the module to the power supply. Preferably, the power paddle card has a connector that blind docks with the power supply when the associated module is installed in the chassis. Each power paddle communicates the power circuit between the power supply and one of the modules. However, it is preferable that only one compute module in the common chassis has a power management bus connection that extends the power management bus between the power management bus controller and the motherboard of the only one compute module. The power management bus is preferably connected through the power paddle.

Another embodiment of the invention provides a method of controlling power consumption in a computer system. The method comprises selectively coupling a power circuit and a power management bus between a motherboard having a baseboard management controller and a power supply having a power management bus controller, sending a power capacity rating of the power supply from the power management bus controller to the baseboard management controller over the power management bus, and controlling the operation of the motherboard to prevent power consumption from exceeding a power cap that is equal to the power capacity rating of the power supply. Preferably, the power supply is interchangeably selected from a group of power supplies having different power capacities, each power supply having an associated power management bus controller with memory storing the power capacity rating of the associated power supply. Most preferably, the step of sending the power capacity of the power supply to the baseboard management controller is performed in response to booting the motherboard.

Preferably, the method further comprises interchangeably selecting the power supply from a group of power supplies having different power capacities, each power supply having an associated power management bus controller with memory storing the power capacity rating of the associated power supply. Beneficially, the selected power supply will preferably have a power capacity rating that will supply power for an actual system configuration including the motherboard and an expected workload for the actual system. In a further embodiment, the step of sending the power capacity of the power supply to the baseboard management controller is performed in response to booting the motherboard.

The use of an appropriately-rated power supply minimizes the amount of excess and unused power in the rack. Although power capping application programs are used to control power consumption below the power capacity rating of the installed power supply, the power supply itself protects the system by tripping a breaker in the power supply in response to the power consumption exceeding the power capacity rating. Accordingly, the protection provided by the power supply meets regulatory requirements because limits on power consumption are not solely dependent upon software. Still further, the power cap is allowed to be user-modified to an amount that is less than the power capacity rating of the power supply, but the method will disallow any attempt to modify the power cap to an amount that is greater than the power capacity rating of the power supply.

Yet another embodiment of the invention provides a computer program product for controlling power consumption, the computer program product comprising a computer usable medium embodying computer usable program code. The computer usable program code comprises program instructions for sending a power capacity rating of the power supply from the power management bus controller to the baseboard management controller over the power management bus, and program instructions for controlling the operation of the motherboard to prevent power consumption from exceeding a power cap that is equal to the power capacity rating of the power supply. In further embodiments, the computer program product may further comprise program instructions for carrying out any aspect of the foregoing method or operation of any aspect of the foregoing system. Most preferably, the program instructions for sending a power capacity rating to baseboard management controller are performed in response to booting the motherboard.

In a still further embodiment, the chassis includes a plurality of module bays, wherein only one of the module bays has a power management bus connection to extend the power management bus of a compute module motherboard into communication with the fan controller. In this manner, the baseboard management controller of the compute module installed in the module bay having the power management bus connection, is responsible for controlling power consumption. Alternatively, each module bay may have a power management bus connection, but only one compute module should be provided with an internal power management bus cable. In either way, this embodiment allows only the baseboard management controller of one compute module to control power consumption for all of the modules and other components that draw power from the power supply.

In yet another embodiment, the chassis further comprises a fan assembly. The fan assembly preferably includes a plurality of fans secured in a distal end of the chassis and directed to draw air flow through the modules that have been received in the chassis and exhaust the air out the back (distal end) of the chassis. In a 2U chassis, each fan preferably has a housing that spans the width of both modules. Accordingly, the plurality of fans is arranged across the longer dimension of the chassis' back end. The fan assembly typically receives power from the same power supply that provides power to the modules, and may be controlled by the power management bus controller.

It should be recognized that the chassis may include any number of module bays, but the chassis preferably has two, three or four module bays. Optionally, the rack may receive a plurality of chassis with a different number of module bays, such as a rack receiving at least one chassis with two module bays (a 2U chassis) and at least one chassis with three module bays (a 3U chassis).

As previously stated, the systems, methods and computer program products of the invention may be implemented in a stand-alone computer system, but are most preferably and most beneficially implemented in chassis, racks or data centers where excess or unused power capacity can be quite large. In the Figures that follow, FIGS. 1 through 6 describe a system of modules, chassis and racks that make use of the invention. However, the embodiments shown in the Figures are examples only, and the invention is limited only by the scope of the claims.

FIG. 1 is a perspective view of a rack 10 receiving a first chassis 32 into a chassis bay 36 in the left hand column 16 of the rack 10 and a second chassis 34 into a chassis bay 38 in the right hand column 18 of the rack 10. The two chassis 32, 34 are received and supported on horizontal rails 40 that are spaced to accommodate the 2U chassis 32 and the 2U chassis 34. The vertical spacing between rails 40 is preferably adjustable to accommodate any combination of chassis having the same or different size. Furthermore, the first 2U chassis 32 is receiving two 1U compute modules 46 and the second 2U chassis 34 is receiving a 1U compute module 46 and a 1U expansion module 44 including a bank of four disk drives.

To the right of each column 16, 18 there are a plurality of network switch bays 50 that are suitable to receive a plurality of network switches (not shown). Having the network switch bays 50 located along the edge of the chassis bays 36, 38 facilitates network cable connections between compute modules and a network switch that are short, avoid interfering with access to adjacent modules, and allow the connections to be made from the front side 12 of the rack.

Figure 2:
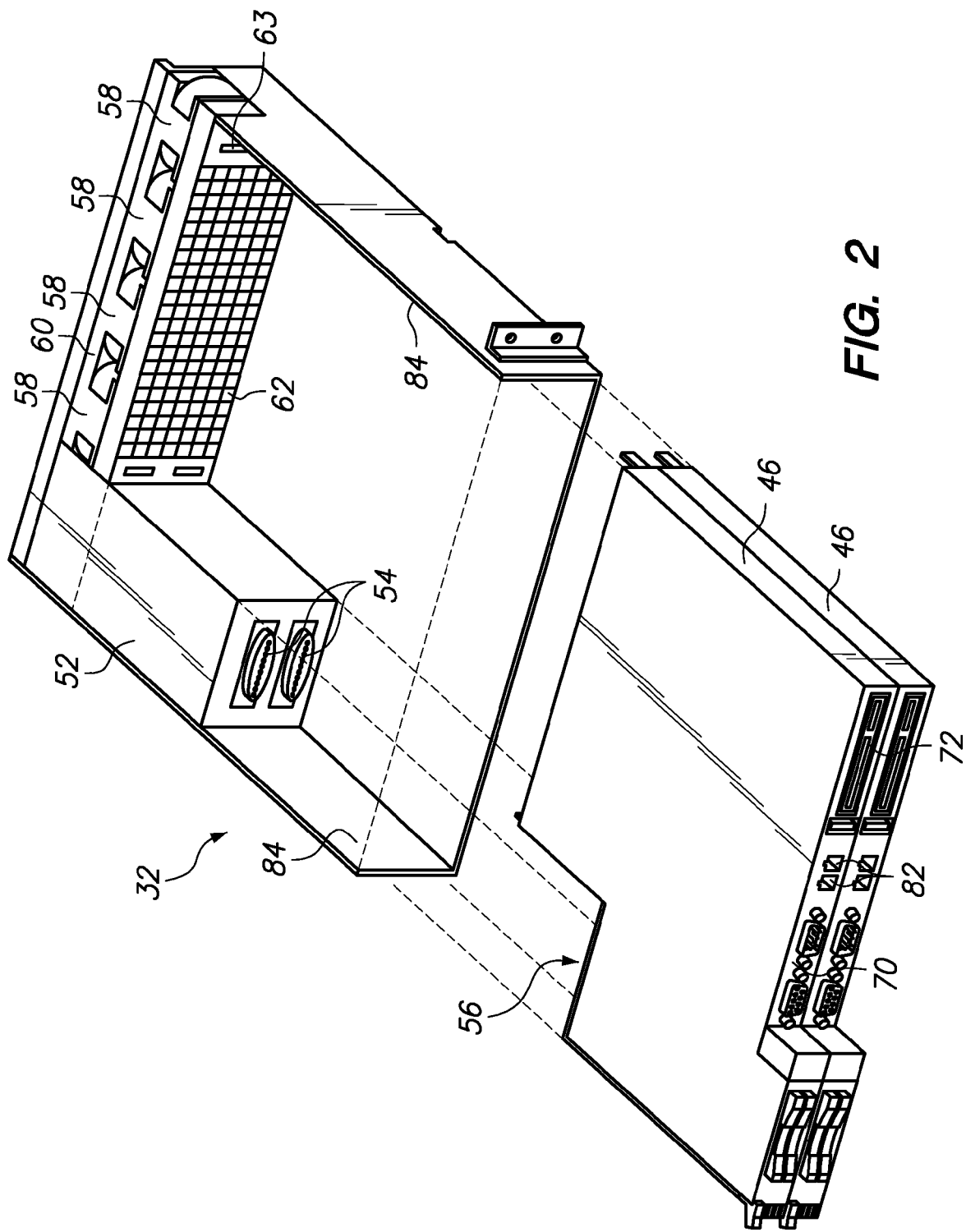
FIG. 2 is a perspective view of a chassis receiving two compute modules.

Furthermore, the lower left side rail 40 of each chassis bay 36, 38 secures an AC power cord connector 48 arranged in order to blind dock with a chassis power supply (See power supply 52 in FIG. 2). As shown, the forwardly-directed cord connector 48 is aligned with a rearwardly-directed mating connector on the power supply so that complete insertion of the chassis 32, 34 into the respective chassis bay 36, 38 completes the connection and supplies power to the respective power supply. No access from the back of the rack 10 is necessary to complete this connection.

FIG. 2 is a perspective view of the first chassis 32 receiving the two compute modules 46. The 2U chassis 32 includes a power supply 52 having two front-facing connectors 54 for direct blind docking with mating connectors 56 (See FIG. 3A) on the compute modules 46. The power supply may be easily removed and replaced with a similar power supply having a different power capacity rating. The 2U chassis 32 also includes a fan assembly or pack 60 including four fans 58 secured along the back of the chassis 32. The fan assembly 60 is also shown with an air intake grill 62. Although the number of fans may vary, the 2U chassis 32 can accommodate larger diameter fans than a 1U module. Accordingly, the chassis 32 provides fewer, but larger fans that provide an air flow that is suitable to cool the module components while making more efficient use of electricity. Optionally, a 3U chassis might have only three or four fans with an even greater diameter.

The two compute modules 46 are preferably independently aligned and inserted into the chassis 32. Optionally, a single compute module may be installed or two compute modules may be installed separately as needed. In the embodiment shown, each individual compute module 46 includes an input/output panel 70 and a PCI slot 72. Furthermore, the input/output panel 70 includes standard network connectors, such as Ethernet connectors 82, which can be used to connect the compute module to a network switch (not shown) using an Ethernet cable. For purposes of this disclosure it is assumed that each compute module is similarly equipped although the number and types of components may vary.

Upon insertion into the chassis 32, the compute modules 46 are guided rearward along the side walls 84 of the chassis 32 until a rearwardly-directed power connector 56 on each the two compute modules 46 has blind docked with one of the two forwardly-directed connectors 54 on the power supply 52. The vertical spacing of the forwardly-directed connectors 54 and the rearwardly-directed connectors 56 is the same to facilitate their connection. Accordingly, the components within each compute module are supplied with power. Preferably, the fan assembly 60 is directly powered and controlled by the power supply 52 which gets thermal sensor data from sensors within the chassis and/or from the compute module itself.

Figure 3:
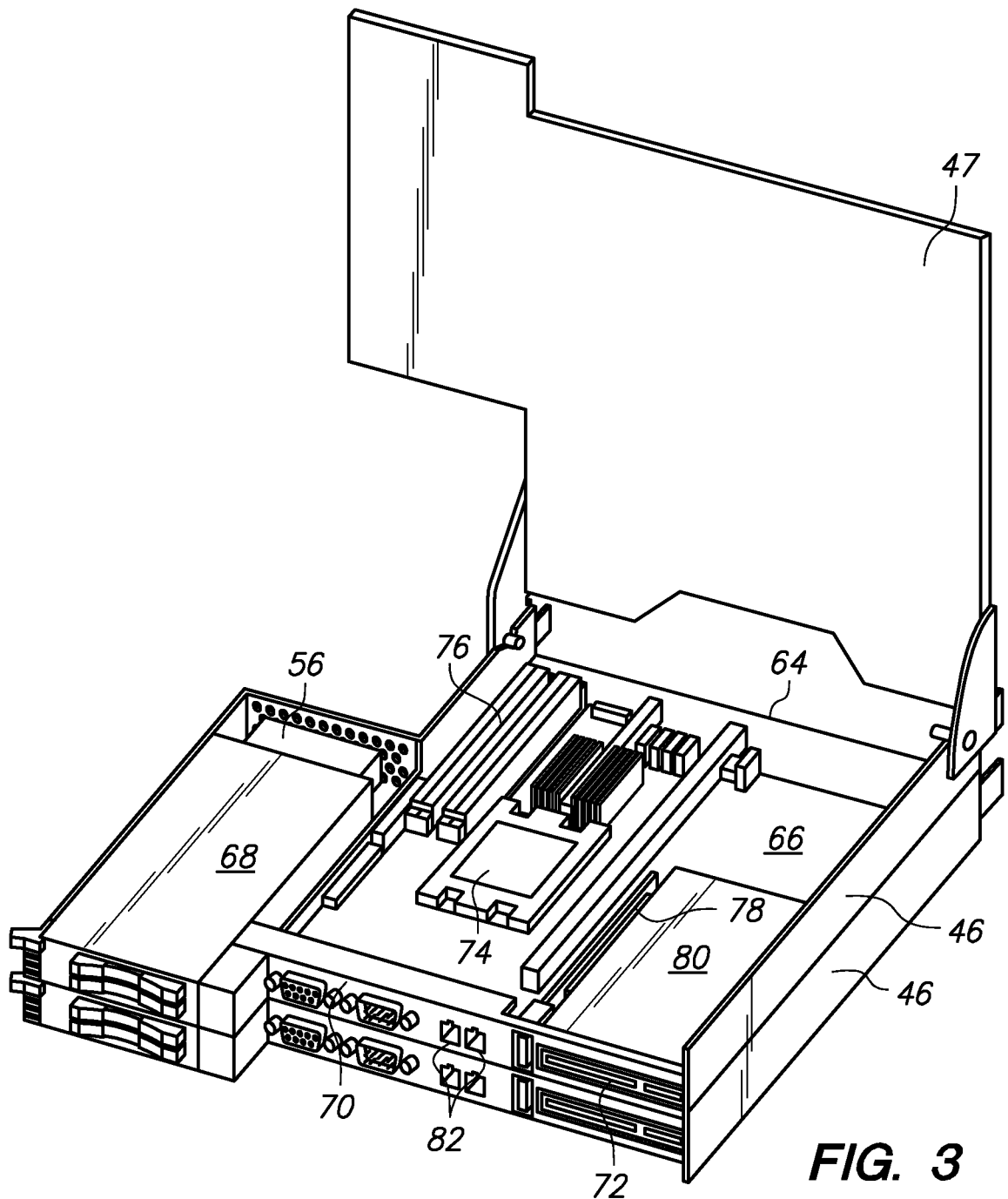
FIG. 3 is a perspective view of two compute modules, wherein the upper module has its top cover opened for illustration.

FIG. 3 is a perspective view of two compute modules 46, wherein the upper module has its top cover 47 opened for illustration. The module 46 includes a tray 64, a rearwardly-directed power connector 56, a motherboard 66, and a hard disk drive 68. The motherboard 66 is preferably an industry standard motherboard, for example including a processor 74, a plurality of memory modules 76, a riser card 78 and a PCI card 80. Other components that are necessary or beneficial to the operation of the motherboard 66 are not necessarily shown, but it should be understood that such other components will be present on a functioning motherboard. Cable connections from the rearwardly-directed power connector 56 to the motherboard 66 and the hard disk drive 68 are also provided.

Figure 4:
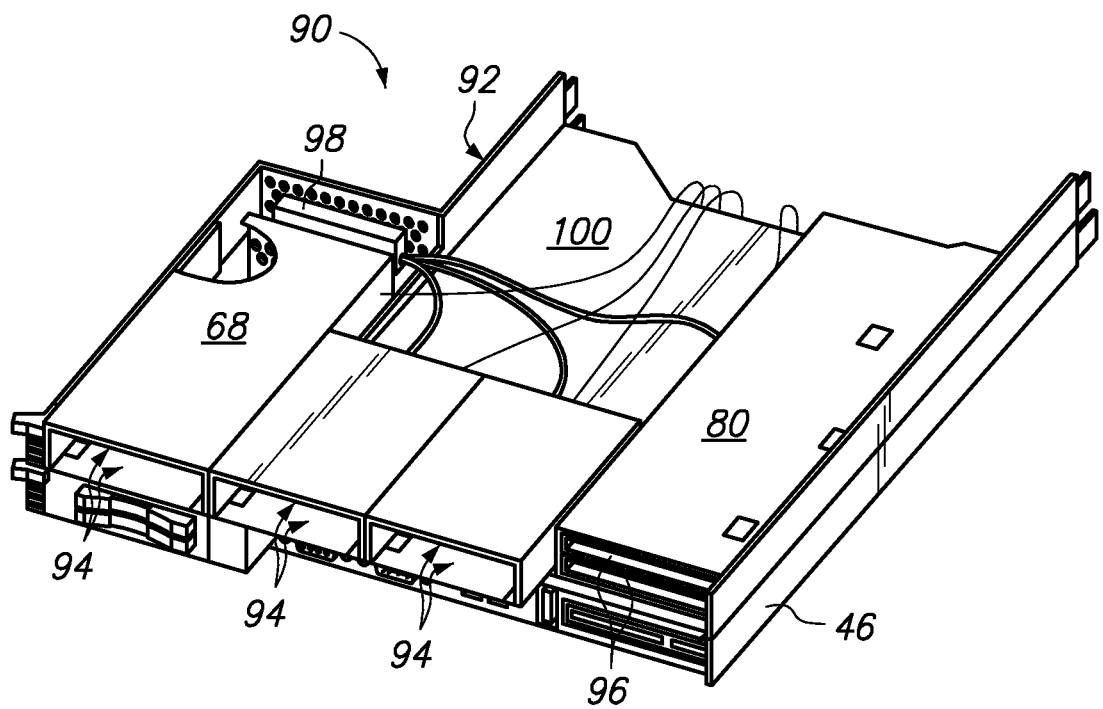
FIG. 4 is a perspective view of a compute module and an expansion module having different power requirements.

FIG. 4 is a perspective view of a 2U computer subassembly 90 including a single compute module 46 and a first expansion module 92 secured above the compute module. The different configurations and components within these modules give them different power requirements. An exemplary compute module 46 was described in relation to FIG. 3A. In FIG. 4, the first expansion module 92 has six small form factor hard disk drive bays 94 and two PCI slots 96. A rearwardly-directed power connector 98 is disposed on the expansion module tray 100 to directly blind dock with a power supply connector 54 (See FIG. 2) and provide power to each of the hard disk drive bays 94. One or more openings in the expansion module tray 100 allow one or more communication cable to extend between components installed in the expansion module 92 and the motherboard 66 in the compute module 46 that lies beneath the expansion module. Accordingly, it is preferable, but not absolutely necessarily, for the compute module and expansion module to be mechanically coupled to aid in their coordinated insertion into a chassis. Both the expansion module 90 and the compute module 46 in FIG. 4 may then be installed in the same 2U chassis, such as the chassis 32 of FIG. 2.

Figure 5:
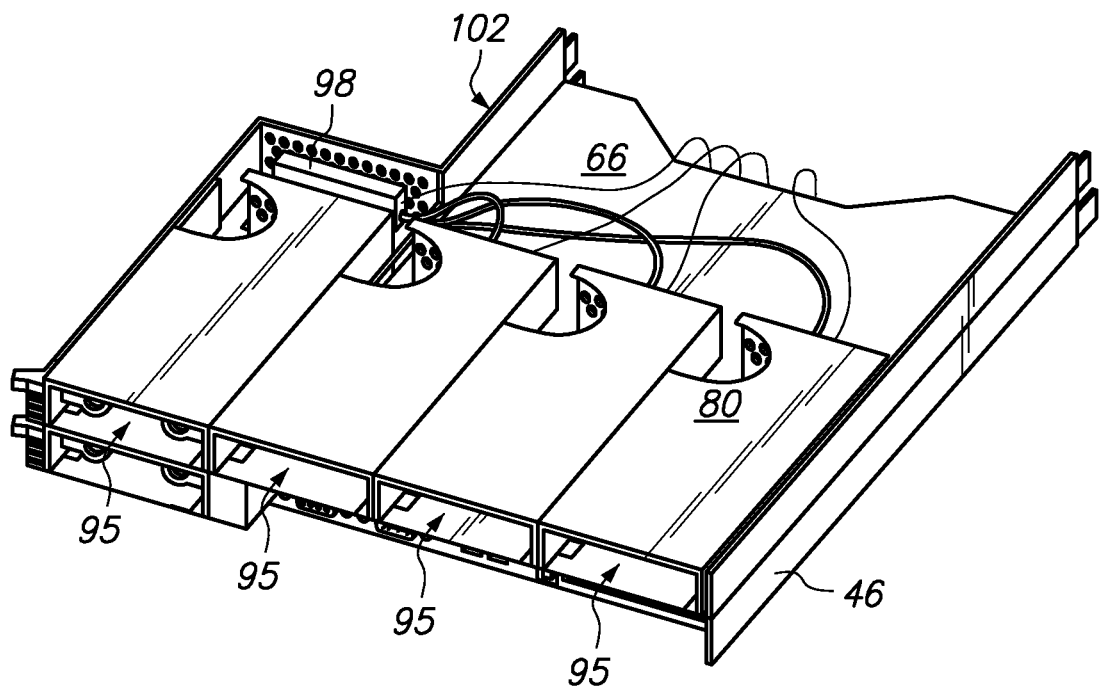
FIG. 5 is a perspective view of a compute module and a second expansion module having different power requirements.

FIG. 5 is a perspective view of a 2U computer subassembly including a single compute module 46 and a second expansion module 102 secured to the compute module. The compute module 46, the expansion module 92, and the expansion module 102 of FIG. 4 each have different components resulting in different power requirements. In particular, the second expansion module 102 includes four 3.5 inch hard disk drive bays 95 and no PCI slots.

Figure 6:
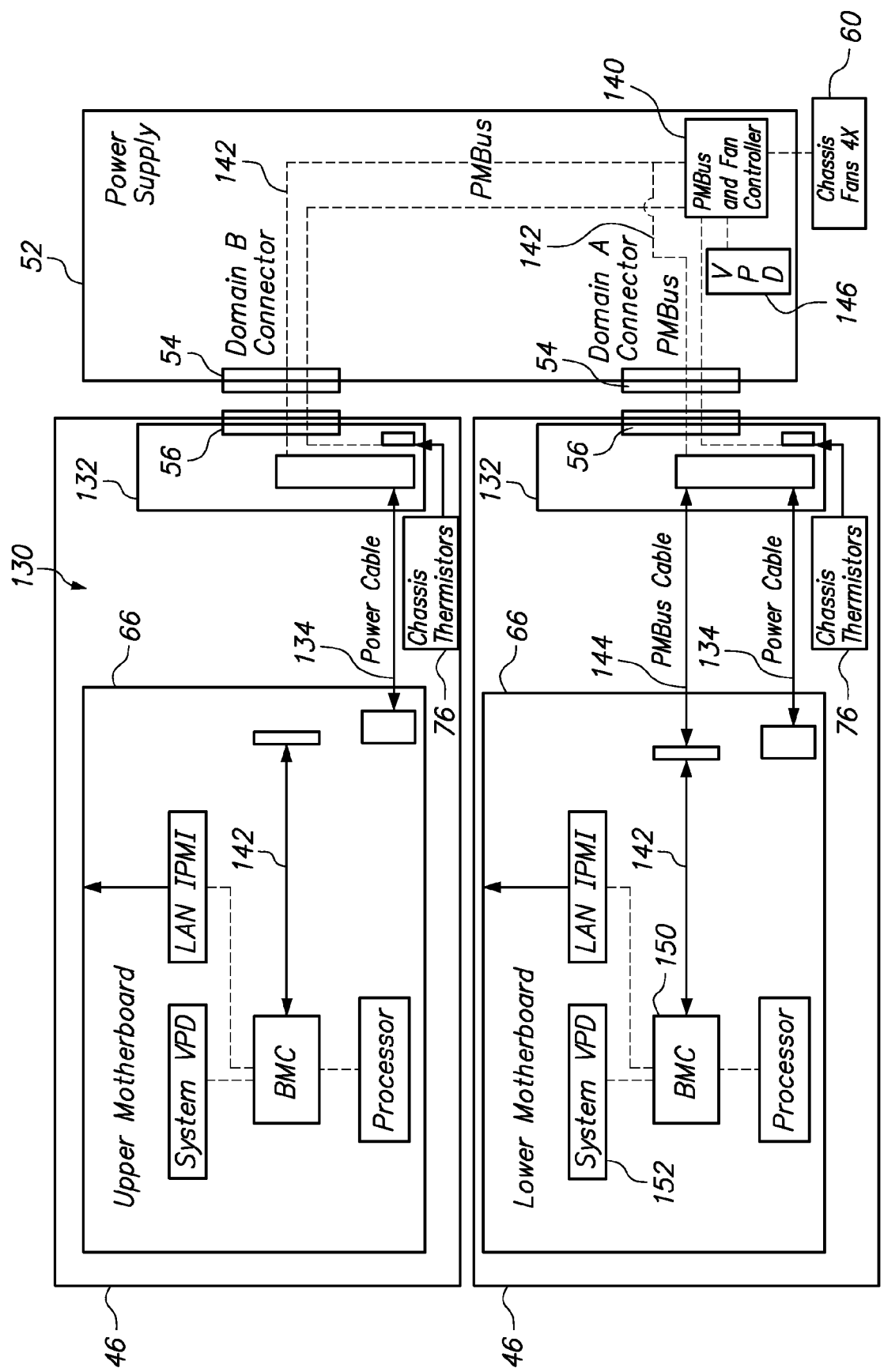
FIG. 6 is a schematic diagram of a system for preventing system power consumption from exceeding a power capacity rating provided by a selected power supply.

FIG. 6 is a schematic diagram of a system 130 for preventing system power consumption from exceeding a power capacity rating provided by a selected power supply 52. The system 130 shows a power supply 52 having two connectors 54 for coupling with connectors 56 on each of two compute modules 46. Alternatively, the upper module 46 could be replaced with an expansion module (for example, see expansion module 92 of FIG. 4 and expansion module 102 of FIG. 5) or there need not be any upper module.

The power supply 52 provides electrical power to a power paddle card 132 in each of the two modules 46. Each power paddle card 132 then transmits electrical power to the motherboard 66 or other components of the module, typically via a cable 134. In each compute module 46, a thermal sensor 76, such as a thermistor, has its output coupled to the power paddle card 132 for communication through the connectors 56, 54 to a fan controller, preferably disposed in a common housing with the power supply 52. The fan controller may be part of a power management bus controller 140 that controls both the power management bus 142 and the fans 60.

The power management bus 142 is preferably extended to both modules 46, but only the lower motherboard 66 has a power management bus (PMBus) cable 144 for extending the bus to the motherboard 46. Accordingly, the baseboard management controller (BMC) 150 of the lower motherboard 66 can communicate with the power management buss and fan controller 140 over the power management bus 142 and cable 144. Preferably, only the baseboard management controller 150 of the lower motherboard will include power capping software or execute power capping methodology. As previously described, the power capacity rating of the power supply 52 is stored in memory associated with the power management bus controller 140, such as in the vital product data storage 146. Upon system startup, the power management bus controller 140 sends the power capacity rating over the power management bus 142 to the baseboard management controller 150, which may store the power capacity rating in associated memory 152 along with other vital product data. As a result, the baseboard management controller 150 has the appropriate power capacity rating for the installed power supply and may cap power consumption by setting the power cap setpoint no greater than the power capacity rating. It should be recognized that the configuration of the individual modules and the combination of modules, as well as the expected workload of those modules, should be used to select a power supply having an appropriate power capacity rating for typical operating ranges rather than maximum possible operation. Other power supplies with different power capacity ratings may be used with a chassis having a different configuration of modules and/or different expected workloads. Furthermore, the power supply within a given chassis may be replaced with a similar power supply having a different power capacity rating if the chassis is being reconfigured or is expected to have a different workload. The actual power capacity rating of any installed power supply is automatically sent from the power management bus controller associated with that power supply to the baseboard management controller for use in power management and capping.

A feedback-based power management system may involve, for example, a motherboard having a built-in power meter circuit, Advanced Configuration and Power Interface (ACPI), and other hardware and/or software elements. The baseboard management controller is used to monitor real-time power consumption. Using this feedback, a service processor can "throttle" the processors and/or memory on the motherboard, such as a server, to maintain the power consumption below a set point or power cap received from the power management bus controller during the boot process, or possibly a lower power cap set by an administrator.

A number of methods are known for controlling power consumption of individual servers, for example. In such a non-limiting example, power capping involves enforcing a power limit upon a server by selectively reducing processor performance. The server may enforce the power limit, for example, using the power meter to measure the amount of power drawn and instantaneously responding to increases in power consumption by throttling the processors and/or memory when a power threshold is reached. While power-capping techniques are useful for managing power consumption of a server individually, other system-wide parameters may also be considered. For example, power constraints on the system as a whole may be considered, in addition to managing power consumption to the servers individually. Furthermore, the aggregate margins between each server's power cap and its actual power consumption represents unused power availability.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process or method such that the instructions which execute on the computer or other programmable apparatus provide processes for implementing the functions/acts specified in the flowchart and/or block diagram block or blocks.

Figure 7:
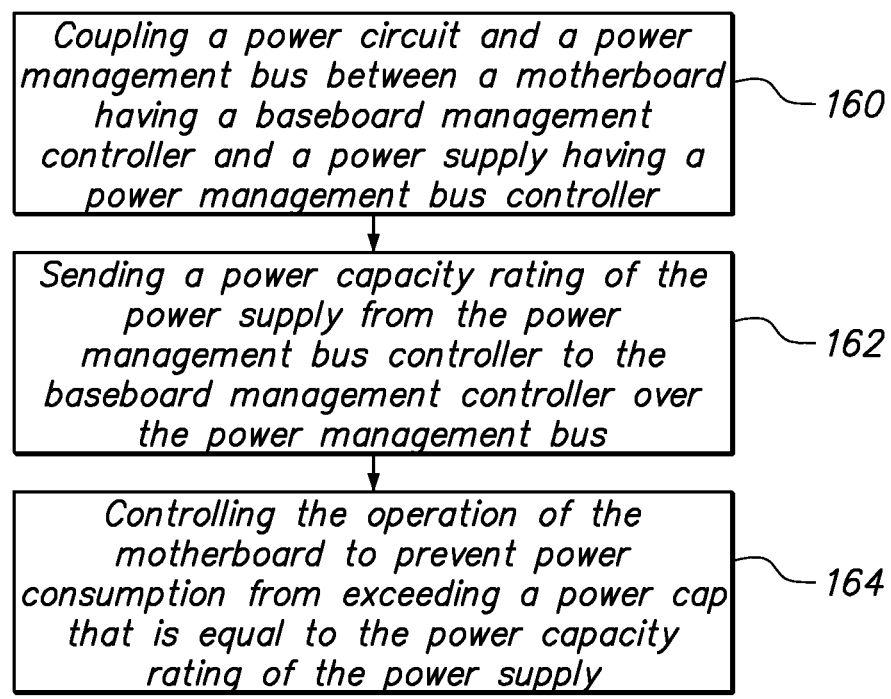
FIG. 7 is a flowchart of a method for power capping.

Referring now to FIG. 7, a flowchart of a method for power capping is shown. In step 160, a power circuit and a power management bus are selectively coupled between a motherboard having a baseboard management controller and a power supply having a power management bus controller. In step 162, a power capacity rating of the power supply is sent from the power management bus controller to the baseboard management controller over the power management bus. Then, in step 164, the operation of the motherboard is controlled to prevent power consumption from exceeding a power cap that is equal to the power capacity rating of the power supply.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer system, comprising:
   a power supply interchangeably selected from a group of power supplies having different power capacities, each power supply having an associated power management bus controller with memory storing the power capacity of the associated power supply;

a motherboard having a processor and a baseboard management controller;

a power circuit for providing power from the power supply to the motherboard; and a power management bus providing communication between the baseboard management controller and the power management bus controller associated with the selected power supply, wherein the power management bus controller provides the stored power capacity to the baseboard management controller, and wherein the baseboard management controller limits operation of the processor to control the amount of power consumed from exceeding the power capacity of the selected power supply.

2. The system of claim 1, wherein the power supply and the motherboard are installed in a common chassis.

3. The system of claim 1, wherein the motherboard is included in a compute module, wherein the common chassis includes at least a second module selected from a compute module and an expansion module, and wherein the power supply provides electricity to each module installed within the chassis.

4. The system of claim 3, wherein each module includes a power paddle for selective coupling to the power supply.

5. The system of claim 4, wherein each power paddle communicates the power circuit between the power supply and the modules.

6. The system of claim 5, wherein only one compute module in the common chassis has a power management bus connection that extends the power management bus between the power management bus controller and the motherboard of the only one compute module.

7. The system of claim 1, wherein the baseboard management controller controls the amount of power consumed using a software application program.

8. A method comprising:
selectively coupling a power circuit and a power management bus between a motherboard and a power supply for providing power from the power supply to the motherboard, wherein the motherboard has a processor and a baseboard management controller, and wherein the power supply has a power management bus controller with memory storing the power capacity of the power supply;

sending a power capacity rating of the power supply from the power management bus controller to the baseboard management controller over the power management bus; and controlling the operation of the processor to prevent power consumption from exceeding a power cap that is equal to the power capacity rating of the power supply.

9. The method of claim 8, further comprising:
interchangeably selecting the power supply from a group of power supplies having different power capacities, each power supply having an associated power management bus controller with memory storing the power capacity rating of the associated power supply.

10. The method of claim 9, wherein the selected power supply has a power capacity rating that will supply power for an actual system configuration including the motherboard and an expected workload for the actual system.

11. The method of claim 8, wherein the step of sending the power capacity rating of the power supply to the baseboard management controller is performed in response to booting the motherboard.

12. The method of claim 8, further comprising:
tripping the power supply in response to the power consumption exceeding the power capacity rating.

13. The method of claim 8, wherein the step of controlling the operation of the motherboard is performed by the baseboard management controller, the method further comprising:
allowing modification of the power cap to an amount that is less than the power capacity rating of the power supply; and
disallowing modification of the power cap to an amount that is greater than the power capacity rating of the power supply.

14. The method of claim 8, wherein the step of controlling the operation of the motherboard includes sensing the amount of power consumed.

15. A computer program product for controlling power consumption, the computer program product comprising a non-transitory computer usable medium embodying computer usable program code, the computer usable program code comprising:
program instructions for sending a power capacity rating of a power supply from a power management bus controller on the power supply over a power management bus to a baseboard management controller on a motherboard that is coupled to the power supply via a power circuit for providing power from the power supply to the motherboard, wherein the power management bus controller has memory storing the power capacity of the power supply; and
program instructions for controlling the operation of a processor on the motherboard to prevent power consumption from exceeding a power cap that is equal to the power capacity rating of the power supply.

16. The computer program product of claim 15, wherein the program instructions for sending a power capacity rating are performed in response to booting the motherboard.

17. The computer program product of claim 15, the computer usable program code further comprising:
program instructions for allowing modification of the power cap to an amount that is less than the power capacity rating of the power supply; and
program instructions for disallowing modification of the power cap to an amount that is greater than the power capacity rating of the power supply.

18. The computer program product of claim 15, wherein the program instructions for controlling the operation of the motherboard are executed by the baseboard management controller.

19. The computer program product of claim 15, wherein the program instructions for sending a power capacity rating are executed by the power management bus controller.

* * * * *